United States Patent
Nowak

(10) Patent No.: US 9,197,140 B2
(45) Date of Patent: Nov. 24, 2015

(54) INVERTER SCALABLE IN POWER AND FREQUENCY

(75) Inventor: Stefan Nowak, Hessdorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 213 days.

(21) Appl. No.: 13/816,026

(22) PCT Filed: Jul. 8, 2011

(86) PCT No.: PCT/EP2011/061647
§ 371 (c)(1),
(2), (4) Date: Feb. 8, 2013

(87) PCT Pub. No.: WO2012/019839
PCT Pub. Date: Feb. 16, 2012

(65) Prior Publication Data
US 2013/0135913 A1    May 30, 2013

(30) Foreign Application Priority Data
Aug. 9, 2010   (DE) .................. 10 2010 033 755

(51) Int. Cl.
H02M 7/49       (2007.01)
H02M 7/537      (2006.01)
H02M 7/493      (2007.01)
H02M 7/5387     (2007.01)

(52) U.S. Cl.
CPC ............... *H02M 7/537* (2013.01); *H02M 7/49* (2013.01); *H02M 7/493* (2013.01); *H02M 7/5387* (2013.01)

(58) Field of Classification Search
CPC ... H02M 3/33569; H02M 1/12; H02M 7/537; H02M 7/493
USPC .................... 363/16, 40, 71, 131, 50–57, 727
See application file for complete search history.

(56) References Cited

U.S. PATENT DOCUMENTS

| | | | | |
|---|---|---|---|---|
| 3,697,717 | A * | 10/1972 | Kornrumpf et al. | 219/625 |
| 6,031,738 | A * | 2/2000 | Lipo et al. | 363/37 |
| 8,279,640 | B2 * | 10/2012 | Abolhassani et al. | 363/37 |
| 8,601,190 | B2 * | 12/2013 | Pipho et al. | 710/110 |
| 8,811,048 | B2 * | 8/2014 | Zhang et al. | 363/37 |
| 8,964,432 | B2 * | 2/2015 | Tang et al. | 363/71 |
| 8,976,526 | B2 * | 3/2015 | Kulkarni et al. | 361/700 |
| 2003/0179595 | A1 * | 9/2003 | Kleveland | 363/132 |
| 2008/0088186 | A1 * | 4/2008 | Hammond | 307/125 |
| 2009/0273952 | A1 * | 11/2009 | Rozman et al. | 363/41 |
| 2010/0141190 | A1 * | 6/2010 | Fraeger | 318/400.27 |
| 2011/0044010 | A1 * | 2/2011 | Ledezma et al. | 361/727 |
| 2013/0063070 | A1 | 3/2013 | Chen | |

FOREIGN PATENT DOCUMENTS

| | | |
|---|---|---|
| CN | 1663728 A | 9/2005 |
| DE | 3910118 A1 | 10/1990 |

(Continued)

*Primary Examiner* — Adolf Berhane
*Assistant Examiner* — Sisay G Tiku

(57) ABSTRACT

An inverter is proposed for providing an inverter output signal scalable in frequency. The inverter has a controller for controlling frequency of the inverter output signal according to a predefinable value. In order to generate a signal having a frequency value prescribed for the inverter output signal, the controller initiates a time delay of signals and superimposes the signals onto the signal having the frequency value prescribed for the inverter output signal. A low-complexity inverter concept for high voltages or high power is thus provided.

7 Claims, 4 Drawing Sheets

(56) References Cited

FOREIGN PATENT DOCUMENTS

| | | | |
|---|---|---|---|
| DE | 10361458 | A1 | 9/2005 |
| DE | 102004021217 | A1 | 12/2005 |
| DE | 102006032640 | A1 | 1/2008 |
| GB | 1063645 | A | 3/1967 |
| JP | 55074379 | A | 6/1980 |
| WO | WO 0227908 | A1 | 4/2002 |

* cited by examiner

INVERTER SCALABLE IN POWER AND FREQUENCY

CROSS REFERENCE TO RELATED APPLICATIONS

This application is the U.S. National Stage of International Application No. PCT/EP2011/061647 filed Jul. 8, 2011 and claims the benefit thereof. The International Application claims the benefits of German application No. 10 2010 033 755.2 filed Aug. 9, 2010, both of the applications are incorporated by reference herein in their entirety.

FIELD OF THE INVENTION

The invention relates to an inverter for providing an inverter output signal that is scalable in power and frequency.

BACKGROUND OF THE INVENTION

Providing current or voltage signals having a defined frequency or, as the case may be, power plays a role in many technical applications. Induction heaters and induction furnaces are instances of circuitries in which an inverter is typically employed. Inverters for induction-heating systems are commercially available and offered in a range of variants. For example the company GH-Induktion Deutschland offers IGBT- and MOSFET-based inverters. Also on sale are frequency inverters that are scalable within a certain scope (devices marketed by the company EMA Indutec GmbH, for instance). Said devices are always more expensive to produce when high voltages are involved. Cost, switching losses, and volume are aspects on which efforts to achieve improvements are currently focused. DE 39 10 118 A1, DE 103 61 458 A1, DE 10 20040 21 217 A1, and DE 10 2006 032 640 A1 are examples of publications describing technical improvements for inverters.

SUMMARY OF THE INVENTION

There is a need for an inverter that is scalable in frequency, can be produced with little effort and expense, and can be employed for high currents or, as the case may be, voltages.

The object is achieved by the inverter that is defined in the independent claim and developed by the dependent claims.

The inventive inverter supplies an output signal (for example alternating current or alternating voltage) that is scalable in its frequency. For generating said output signal, signals are superimposed on a signal having a frequency value specified for the inverter output signal. Said signals are, for example, identical ones (for example pulse sequences or oscillating signals). They are time displaced (through phase shifting, for instance) with the aid of a central controller such that superimposing will produce an output signal having the desired or, as the case may be, set frequency. The controller can have been set up such as to cause the superimposed signals to be generated having a frequency that can be set. The signal having the frequency value specified for the inverter output signal either already constitutes the inverter output signal or will be used for generating the inverter output signal (generating the output signal by, for example, performing suitable transformations on the signals produced through superimposing).

The inventive inverter will thus also allow output signals having a high frequency to be produced with little effort and expense.

According to a development of the inventive subject matter, the inverter comprises a plurality of inverter units. The inverter will then be embodied for linking (for example superimposing or combining) signals of the inverter units for generating the inverter output signal. For protecting the electronic components, the inverter units are preferably each formed having a transformer (isolating transformer) so that electrical isolation or, as the case may be, decoupling will be realized in order thus to improve security from electromagnetic interference.

The inverter can furthermore include a central cooler with the aid of which the individual inverter units are cooled.

The inverter units can be connected in the manner of, for example, a parallel or series arrangement or, as the case may be, a cascade.

The inventive inverter is formed in a manner requiring little effort or expense. It is assembled from individual inverter elements designed for lower frequencies or, as the case may be, powers. Said type of structure using individual elements having lower requirements enables an inverter to be provided that obviates the expense and encumbrances associated with conventional inverters having correspondingly substantial requirements. Said inverter makes scaling possible over a wide frequency range. That is evidenced by the theoretically lowest frequency's being determined by an inverter element's bottom frequency limit whereas the highest frequency is determined by an inverter element's maximum frequency multiplied by the maximum number of output signals of the inverter elements. The individual inverter units are therein scalable preferably also in frequency turns.

As part of a first embodiment variant regarding the arrangement of the inverter units, the inverter is embodied for superimposing output signals of the inverter units on the inverter output signal. The controller will then have been set up to cause the output signals, by being time-delayed, to be superimposed having a specified frequency value on the inverter output signal. Said inverter output signal will then as a rule have a higher frequency than the output signals of the inverter units. That embodiment variant can have a (possibly additional) isolating transformer for superimposing output signals of the inverter units. A frequency setting for the inverter units' output signals can furthermore be provided.

Within the scope of a second embodiment variant regarding the inverter units' arrangement, the inverter is constructed in keeping with a cascading of the inverter units. The controller will then have been set up to generate an output signal of at least one of the inverter units having the specified frequency value by means of a time delay followed by superimposing of signals within said inverter unit.

According to a development of the subject matter of the application, the controller has been set up to cause the inverter's output power or, as the case may be, output frequency to be controlled by specifying or, as the case may be, activating inverter units (for example a number thereof used for an output signal of the inverter). In the case of the above-presented first embodiment variant regarding the arrangement of the inverter units, the number of superimposed signals is determined by the number of inverter units (for example by adding or, as the case may be, disconnecting inverter units used for generating the inverter output signal, with one signal being superimposed by each inverter unit). At a given signal frequency for signals requiring to be superimposed, the output frequency will depend directly on how many signals are superimposed with what time delay. That means the output frequency can be influenced by the number of inverter units used. Controlling of the inverter units' signal frequencies can additionally be provided so that there will be another control parameter here.

Within the scope of the second embodiment variant regarding the inverter units' arrangement it can be provided for inverter units to be switched over between two conditions (activated or deactivated), with a signal transformation being effected in the first condition and the inverter unit having by contrast no effect on the output signal in the second condition.

BRIEF DESCRIPTION OF THE DRAWINGS

The inventive subject matter is described in more detail below within the scope of an exemplary embodiment.

DETAILED DESCRIPTION OF THE INVENTION

Figure 1:
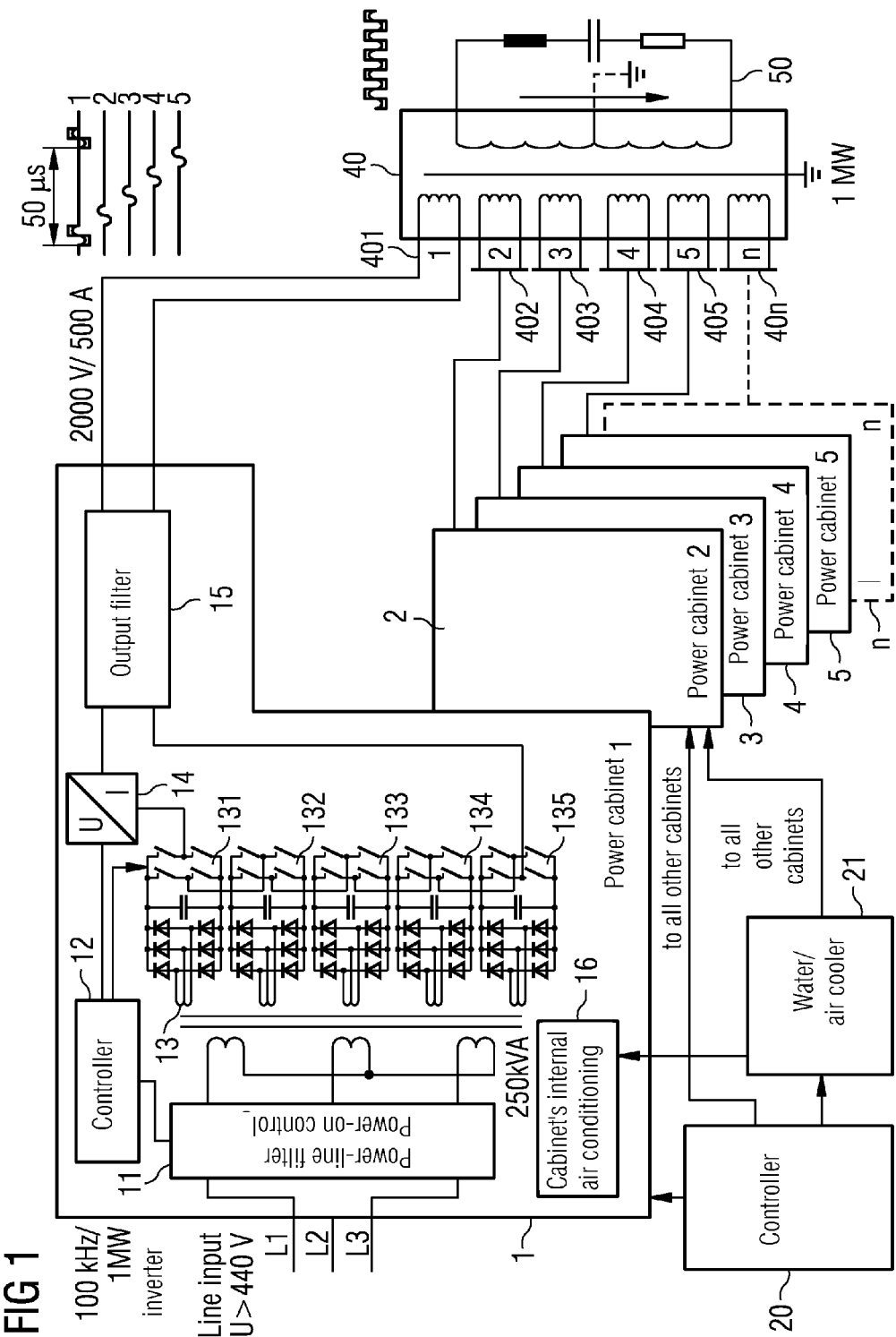
FIG. 1: shows an inventive inverter.

FIG. 1 shows an inventive inverter. It is formed by means of inverter elements or, as the case may be, power cabinets 1 to 5. A further power cabinet n is shown with a dashed outline. That is intended to indicate that an expansion to higher numbers of power cabinets is possible. An already installed complete system can in particular be relatively easily expanded or scaled up if necessary by installing additional power cabinets.

The structure of an element of such type is shown schematically with the aid of power cabinet 1. Power cabinet 1 has three input leads L1, L2, and L3. They constitute a three-phase current input of a three-phase power supply. The three input leads are applied to a voltage U of approximately 440 V or above (medium voltage). Said input leads lead to a component 11 that has a power-line filter and a power-on control. Component 11 includes a rectifier and switching elements (capacitors, for example) for continuous startup.

Component 11 is connected to a controller 12 for the switching elements provided in power cabinet 1, in particular of a transformer 13. Electrical isolation from the line voltage is realized by means of transformer 13 which is dimensioned for 250 kVA (isolating transformer). Said transformer is a 250-kVA 50/60-Hz transformer having on its secondary side 5 three-phase systems or, as the case may be, cylinders 131, 132, 133, 134, and 135 having 5×3 windings.

Power cabinet 1 furthermore has a current/voltage transformer 14 and an output filter 15. The speed of the voltage rise can be limited by means of output filter 15 to protect the output cable (LC cable). The requirements of such type of cable protection depend on the loads that arise and on the cable's performance characteristics. Finally, an internal air-conditioning system 16 is provided in power cabinet 1.

Figure 2:
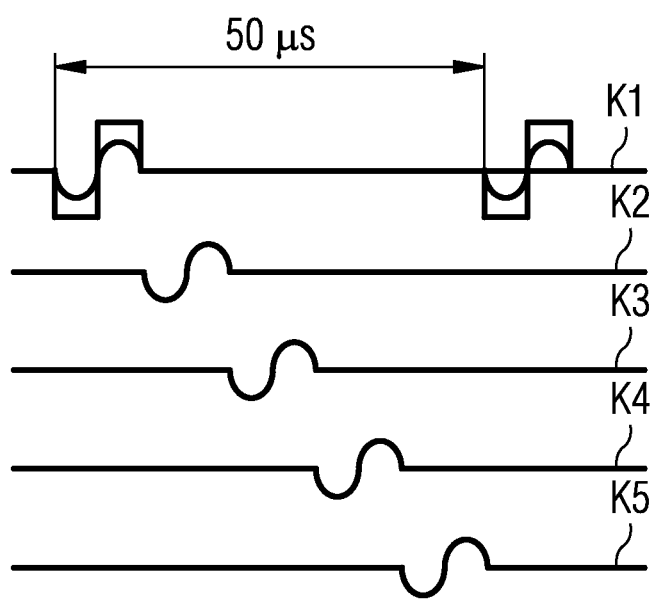
FIG. 2: shows an inventive instance of signal or, as the case may be, pulse superimposing.

Five corresponding power cabinets are provided. They are controlled by a central controller 20. The individual power cabinets' air-conditioning systems (element 16 for power cabinet 1) are fed by means of a central water/air heat cooler 21. The five power cabinets are controlled by controller 20 with a time delay so that the output signals appear one after the other. That is illustrated with the aid of FIG. 2. Top curves K1 to K5 correspond to the output signals of power cabinets 1 to 5. Said signals are sinusoidal pulses generated by means of an LC circuit. The individual oscillations are mutually offset by 10 µs and have (as indicated in curve K1) a period of 50 µs or, as the case may be, a frequency of 20 kHz. These are then combined by means of another transformer into an overall signal G which is shown below in FIG. 2 and has a frequency five times (100 kHz) that of the individual power cabinets' output signals.

The power data can specifically be stated as follows: Each inverter element 1 to 5 accepts a 100-kHz oscillator at a repetition rate of 20 kHz. An inverter element's output voltage will then be approximately 2 kV with use being made of a 250-kVA transformer. The result, therefore, is in each case a power unit or, as the case may be, converter unit for 200 kW and (at most) 20 kHz. An overall system comprises, for example, 5 power units for 1 MW at a maximum frequency of 100 kHz. The maximum power and frequency can then be scaled by using more or fewer power units, for example by using only a part of the five power cabinets for forming the overall output signal. Electrical isolation from the line voltage will have been realized by the transformers in order to satisfy safety requirements here. The necessary input voltage of >440 V can be easily realized; a power unit's output voltage is up to 2 kV.

The overall unit thus consists of five identical power units with an output current of 200 kW and 20 kHz that are connected in parallel to an output transformer 40 having 5 primary windings 401, 402, 403, 404, and 405 (one primary winding 40n is additionally indicated with respect to the system's scalability). It is, for example, a high-frequency transformer having a ferrite core.

Figure 3:
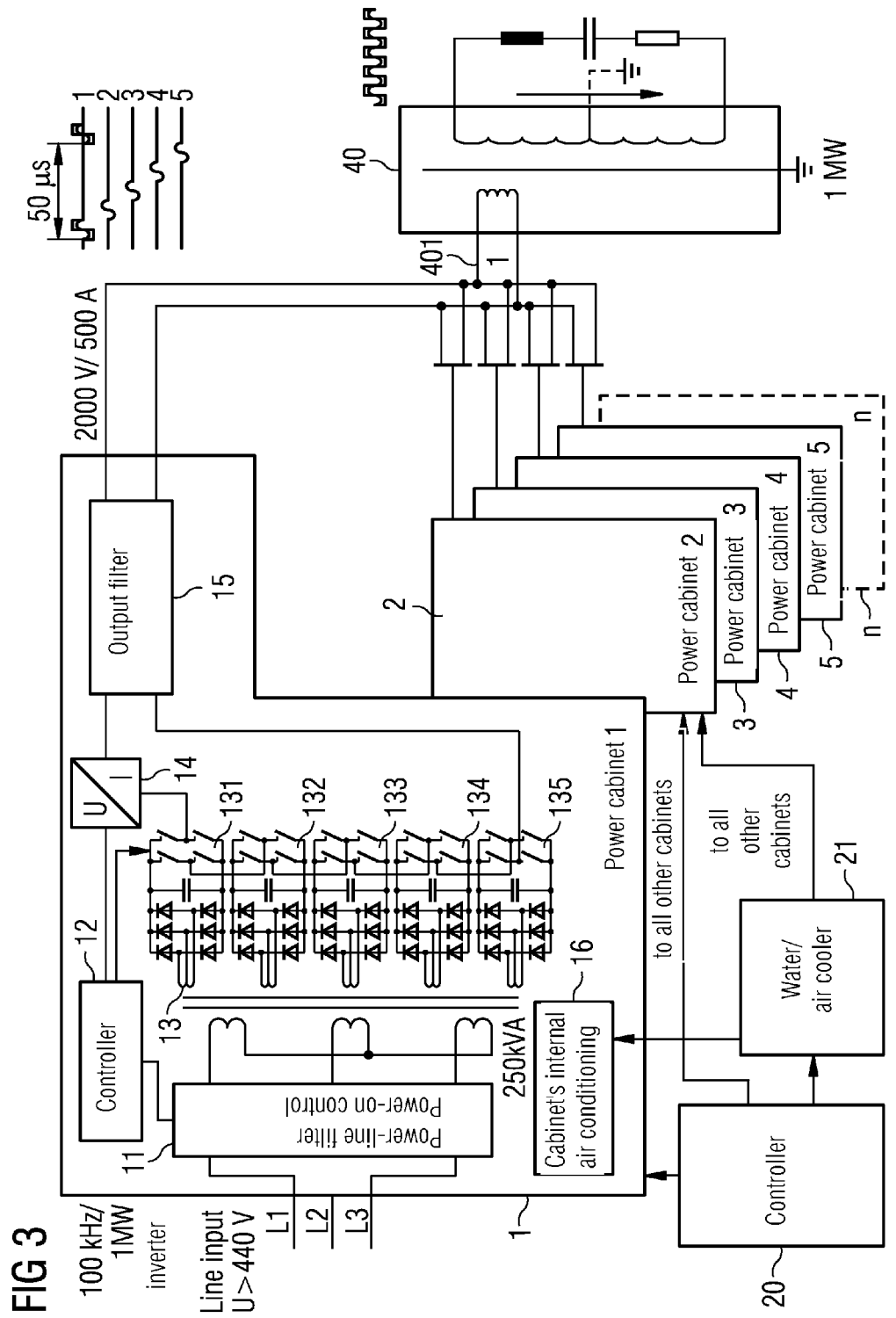
FIG. 3: shows a variant of the inventive inverter with feeding into only one primary winding of the output transformer.

The 5-fold or, as the case may be, n-fold primary windings of output transformer 40 illustrated in FIG. 1 are not absolutely necessary; hard parallel connection to one winding is also possible. That is shown in FIG. 3 in which the signals of inverter elements 1 to 5 are fed into a primary winding 401.

The output frequency of the current can be increased or decreased in stages by up to 20 kHz by adding power units or omitting them. The possible output power is likewise scalable up to 200 kW. Each power unit generates up to 2 kW in the output voltage, thereby reducing the necessary currents and hence the lead cross-section and wiring requirements. An output transformer 50 is provided into which all the power units feed on the primary side. A superordinate controller 20 synchronizes and supplies the power units with the setpoint values. A liquid cooler 21 is also provided.

Circuit 50 enables the output signal to be employed for applications for, for example, inductive heating in the extraction of oil from bituminous sand. The converter can be tuned to the resonant frequency necessary therefor.

Figure 4:
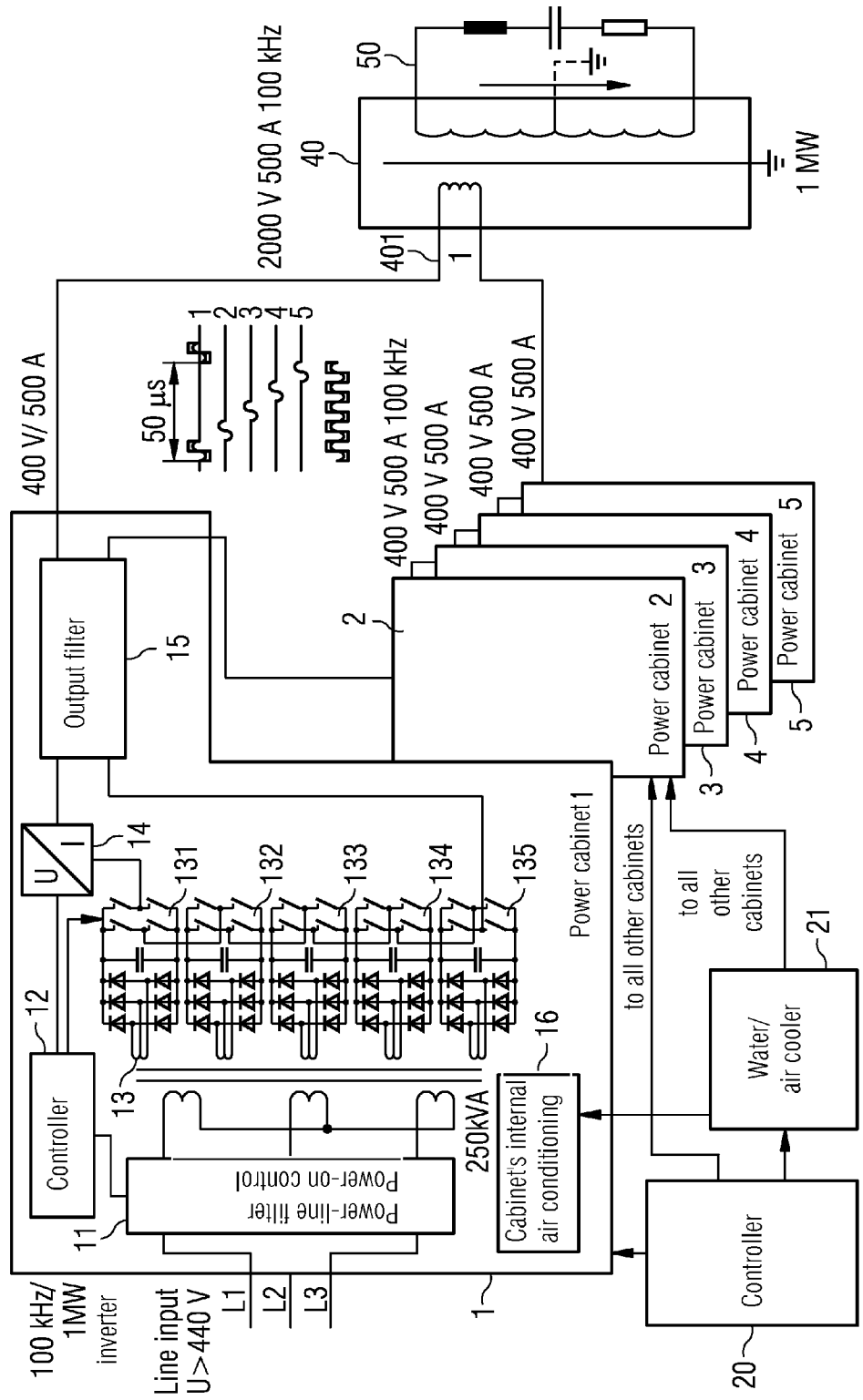
FIG. 4: shows an inventive inverter having inverter elements connected in series.

Another embodiment of the inventive subject matter is shown in FIG. 4. Inverter units 1, 2, 3, 4, and 5 are here connected in series. Here, too, it is possible to specify how many of the inverter units are used. Inverter units that are not required can be switched off or, as the case may be, connected through so as to have no impact on the output signal. That is a solution offering additional outage protection insofar as most trouble involves a faulty inverter unit then behaving like a switched-off unit.

The generating of middle-frequency currents in that high power category can thus be realized with little effort and expense. All that is required therefor are quite small power units rated for 200 kW and a maximum frequency of 20 kHz. The maximum power frequency's scalability is realized by using more or fewer power units. The overall system is for that reason less effort-intensive and more economical than conventional solutions.

The invention has been presented within the scope of an exemplary embodiment intended as illustrative but not limiting. Other variants based on the same principle and to be encompassed within the scope of protection will be immediately obvious to a person skilled in the relevant art. For example other embodiments of inverter elements can be used; ways of realizing how superimposing of the individual output signals is effected other than by means of a transformer are also readily possible.

The invention claimed is:

1. An inverter for providing an inverter output signal that is scalable in power and frequency, comprising:
   a plurality of inverter units, each inverter unit comprising an isolating transformer, a current/voltage transformer, and switching elements, the switching elements being controlled by a respective controller for generating an inverter unit output signal,
   a high-frequency output transformer receiving at least one respective inverter unit output signal,
   a central controller for controlling the frequency of an overall inverter output signal according to a definable value,
   wherein the central controller is adapted to cause the inverter unit output signals of the plurality of inverter units to have a time delay and to superimpose the inverter unit output signals being time delayed on the overall inverter output signal having a frequency specified for the overall inverter output signal.

2. The inverter as claimed in claim 1, wherein the controller is adapted to cause the superimposed inverter unit output signals having the frequency that can be specified.

3. The inverter as claimed in claim 1, wherein the inverter comprises a transformer for superimposing the signals of the inverter units.

4. The inverter as claimed in claim 1, wherein the inverter is constructed in keeping with a cascading of the inverter units, and wherein the central controller is adapted to cause an inverter unit output signal of at least one of the inverter units to have the time delay and to superimpose the inverter unit output signal being time delayed on an output signal of the at least one of the inverter units having the frequency specified within the at least one of the inverter units.

5. The inverter as claimed in claim 1, wherein the central controller is adapted to control an output frequency and/or output power of the inverter by specifying a number of the inverter units to be used for generating the output signal of the inverter.

6. The inverter as claimed in claim 5, wherein the central controller is adapted to add or disconnect the number of the inverter units to be used for generating the output signal of the inverter.

7. The inverter as claimed in claim 1, wherein the inverter comprises a central cooler for cooling the inverter units.

* * * * *